United States Patent [19]
Lotito

[11] Patent Number: 6,124,540
[45] Date of Patent: *Sep. 26, 2000

[54] MUSICAL NOTATION SYSTEM

[76] Inventor: Patricia E. Lotito, 120 Scottholm Ter., Syracuse, N.Y. 13224

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,485

[22] Filed: Dec. 18, 1996

Related U.S. Application Data

[63] Continuation-in-part of application No. 08/340,201, Nov. 14, 1994, abandoned.

[51] Int. Cl.[7] .................................................. G09B 14/02
[52] U.S. Cl. .................................................. 84/483.2
[58] Field of Search .................. 84/483.2, 470 R, 84/471 R, 472, 473, 474, 475

[56] References Cited

U.S. PATENT DOCUMENTS

| | | | |
|---|---|---|---|
| 1,100,824 | 6/1914 | Grant | 84/433 |
| 1,313,015 | 8/1919 | Reeve | 84/483.2 |
| 1,483,380 | 2/1924 | Reeve | 84/483.2 |
| 1,539,308 | 3/1925 | Faunt | 84/433 |
| 1,594,194 | 7/1926 | Bargess | 84/483.2 |
| 3,978,756 | 9/1976 | Feldman | 84/407 R |
| 5,496,179 | 3/1996 | Hoffman | 84/433 |
| 5,549,029 | 8/1996 | Lepinski | 84/483.2 |

*Primary Examiner*—Robert E. Nappi
*Assistant Examiner*—Kim Lockett
*Attorney, Agent, or Firm*—Wall Marjama Bilinski & Burr

[57] ABSTRACT

A system of musical notation uses different base shapes for sharp and flat notes. The system is independent of key signature, thus enabling a student to concentrate on the physical aspects of playing an instrument instead of on the mental aspects of learning sight music. One embodiment uses different base shapes for all sharped and flatted notes. Another embodiment uses different base shapes for notes sharped or flatted by the key signature to enable the student to learn the effects of the conventional key signature.

6 Claims, 8 Drawing Sheets

MUSICAL NOTATION SYSTEM

This application is a continuation in part of co-pending application Ser. No. 08/340,201, filed Nov. 14, 1994, now abandoned.

BACKGROUND OF THE INVENTION

This invention relates to a musical notation system, and in particular, to a notational system which eliminates dependence on using and understanding a key signature while maintaining the integrity of the key signature system.

The teaching and learning of music is a very difficult and demanding process. A student must manage the physical aspects of manipulating a particular instrument, while at the same time learn the language of music, i.e., notes, timing, phrasing, and so on.

Once the basic elements of the music language are learned, the program quickly becomes more rigorous and demanding. The pupil is exposed to sharps and flats, chords, tonics, mediants, dominants, major and minor scales, in short, the whole panoply of unfamiliar musical terminology and notation.

Thus it is little wonder that a large percentage of students of music rapidly lose their initial enthusiasm and either become recalcitrant and difficult students or, if allowed, quit altogether.

Teachers of music have long recognized the phenomenon of students becoming frustrated with the difficulty of learning the whole language of music at the same time that they are learning the physical aspects thereof. In order to ease the problem, a number of different devices have been suggested, all of which are intended to aid and facilitate the early stages of musical instruction.

Thus, for example U.S. Pat. No. 3,733,957 to Peirano et al. shows a flat baseboard with a number of recesses into which musical symbols are fitted. This device is intended to evoke a child's interest and reinforce his or her understanding of the time value of notes and of the scale.

U.S. Pat. No. 1,805,488 to Jolls involves a series of charts and notes which are colored to indicate the tonic, dominant, etc. The colored notes only fit in the appropriate positions of each chart. Flats and sharps are noted by the flat and sharp symbols, ♭ and # respectively, placed inside the colored note bases.

U.S. Pat. No. 1,803,630 to Lossie shows an educational chart for teaching musical notation and composition. The chart is of fabric placed on smooth board with a set of musical symbols which can be manipulated by the student and/or teacher. Various symbols including the sharp and flat symbols may be color coded.

U.S. Pat. No. 1,594,194 to Burgess shows a system of musical notation that uses different shaped notes for sharps and flats as well as for double-sharped and double-flatted notes.

U.S. Pat. No. 1,539,308 to Faunt shows a system of musical notation in which the usual sharps, flats, etc. are represented by ovals, diamonds, and squares, solid or open, with a variety of vertical and horizontal stripes.

U.S. Pat. No. 1,483,380 to Reeve shows a system of musical notation in which the usual sharps, flats, etc. are represented by solid circles, flat and tall rectangles, diamonds, and triangles.

What these inventions all have in common is an attempt to make the learning of musical notation simpler and more attractive to the beginning, especially the younger student.

However while any of these inventions may simplify or make more attractive the learning of the very complex art of musical notation, none of these inventions makes the musical notation itself easier to understand and follow.

Furthermore, in all the prior art inventions, time is still required to learn the complexities of notation at the expense of actually practicing the musical instrument.

In addition, in the prior art inventions consisting of devices, the devices themselves, simple or complex, are relatively cumbersome, especially when compared with a simple sheet of music paper, and cannot be given by the teacher to a student without depriving the teacher and his or her other students of their use.

A special notational problem arises with respect to the conventional representation of sharps and flats on sheet music. The former are designated by the symbol '#', and the latter by the symbol '♭'. This representation is simple to understand when the musical key involved is C with no sharps or flats. However when playing in F sharp major with six sharps, or G flat major with six flats, for example, displaying all the sharps and flats associated with each and every note leads to a cluttered and unreadable score.

Hence, by convention, the key signature is presented at the beginning of a line or piece of music, and the musician is expected thereafter to know which notes are normally sharp or flat as the case may be. This is not a simple process. Upon encountering each note, the musician must make a mental determination as to whether the note should be played as it appears to read, as has been ingrained in the musician throughout a considerable period of instructional time, or whether the note should be translated into a sharp or flat as required by the musical key. This task is further complicated by the ability of the composer to add sharps or flats effective only within a single measure which run counter to the key signature. It is not a coincidence that many students of music quit at about the time that they are introduced to the playing of compositions in musical keys having three or more sharps and flats.

However, using a system of musical notation that entirely eliminates and does not teach key signatures leads to students who are unable to play a vast array of music already created by various talented and gifted composers.

The difficulty of this translation process for increasingly more complex musical keys also places unnatural constraints on the way that music is taught. In the case of keyboard instruments, in particular, the natural uneven structure of the human hand lends itself to using a fair number of black keys, i.e., sharps and flats. However, because of the mental stress of working in musical keys that use many black keys, the first year or two of keyboard work is primarily done using few sharps and flats, such as the key of G or the key of C. Thus the initial exposure of students to the keyboard is not physically comfortable, requiring more instructional and practice time before the student develops a comfortable feel for the keyboard.

Thus, it is desirable to provide a new method of notation which is consistent, easy for the student to learn and use, and easy for the instructor to teach while being inexpensive, portable, convenient, and affirming for students and musicians alike.

OBJECTS AND SUMMARY OF THE INVENTION

It is therefore an object of the present invention to provide a system of musical notation that overcomes the drawbacks and limitations of the prior art.

It is another object of the present invention to provide a system of musical notation that allows a student to play directly off a page of music without having to refer to the key signature while still maintaining the integrity of the key signature.

It is still another object of the present invention to provide a method for teaching music which simplifies the learning and writing of musical notation.

It is a further object of the present invention to provide a method for teaching and playing music wherein the student is not required mentally to translate the note between keys before playing the note.

It is yet another object of the present invention to provide a method for teaching music that allows the beginning student, as well as the advanced musician, to make extensive use of the black keys on a keyboard instrument.

It is still a further object of the present invention to provide a method for teaching music where the beginning student, as well as the advanced musician, learns and plays sharped and flatted values of musical notes without undue stress or discomfort.

Briefly stated, a system of musical notation uses different base shapes for sharp and flat notes. The system is independent of key signature, thus enabling a student to concentrate on the physical aspects of playing an instrument instead of on the mental aspects of learning sight music. One embodiment uses different base shapes for all sharped and flatted notes. Another embodiment uses different base shapes for notes sharped or flatted by the key signature to enable the student to learn the effects of the conventional key signature.

According to an embodiment of the invention, a system of musical notation in which a tone of a note is independent of a key signature includes a natural note having a base represented by a first shape, a sharp note having a base represented by a second shape, the second shape differing from the first shape, a flat note having a base represented by a third shape, the third shape differing from the first and second shapes, a double sharped note represented by a sharp symbol adjacent to the second shape, and a double flatted note represented by a flat symbol adjacent to the third shape.

According to an embodiment of the invention, a system of musical notation includes a key signature, a natural note being represented by a first base shape, a sharp note being represented by a second base shape if the sharp note is sharped due to the key signature and being represented by the first base shape preceded by a sharp symbol if the sharp note is sharped not due to the key signature, a flat note being represented by a third base shape if the flat note is flatted due to the key signature and being represented by the first base shape preceded by a flat symbol if the flat note is flatted not due to the key signature, the second base shape differing from the first base shape, and the third base shape differing from the first and second base shapes.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
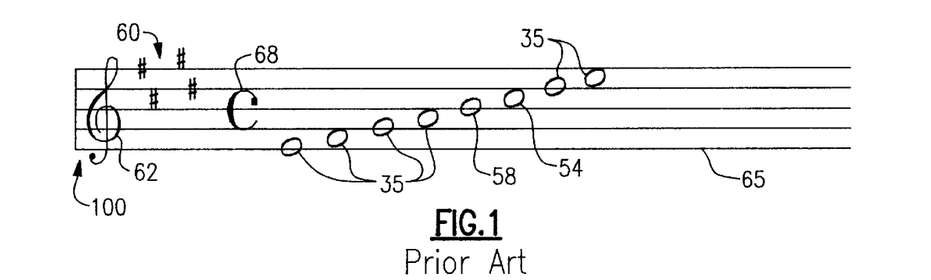
FIG. 1 is a prior art scale written on sheet music in the key of E major.

Referring to FIG. 1, a conventional prior art method of handling musical notation of sharps is shown. A segment of sheet music, designated generally as 100, includes a plurality of notes 35 on a single staff of music 65 which consists of five parallel and equidistant lines defining four spaces. At the beginning of staff 65 is a clef notation 62, shown here as a G, treble, or violin clef, followed by a key signature 60 and a time 68, shown as common or 4/4 time 68.

In music, a "scale" is defined as the tone ladder marking the regular succession of intervals in any given key, from the keynote (first note) to the octave (last note), and indicating the relative pitch of tones. The scale in the key of C major consists of eight notes conventionally designated C, D, E, F, G, A, B, and C. A "major scale" has semitones ("halftones") between the third and fourth notes (the "third step") and between the seventh and eighth notes (the "seventh step").

The other steps are whole tones or "tones." On a keyboard instrument, such as a piano, white keys designate the notes of the scale in the key of C major. Black keys are inserted between every pair of adjacent whole tone white keys to provide for semitones. That is, black keys are provided at the first, second, fourth, fifth, and sixth steps.

All major scales require semitones at the third and seventh steps. For major scales in other than C, this requirement forces some black keys to be included when playing the scale. Sharps and flats are required to play major scales other than C. The conventional musical notation system shows the requirement to play sharps and flats by showing the required sharps or flats in the key signature.

The scale of FIG. 1 is in the key of E major which requires four sharps in key signature 60, namely F, C, G, and D. Wherever those notes appear, even though without a conventional sharp symbol #, they are played as sharps. Thus of the eight notes of the scale, the four sharp notes F, C, G, and D are played as sharps. The other three notes, A, B, and E, are played as natural notes. For example, a note 57, while appearing as a C, is played as a C sharp, whereas a note 58 appears as and is played as a natural B. A base of each note 35 is represented as a circular or nearly circular shape.

Figure 2:
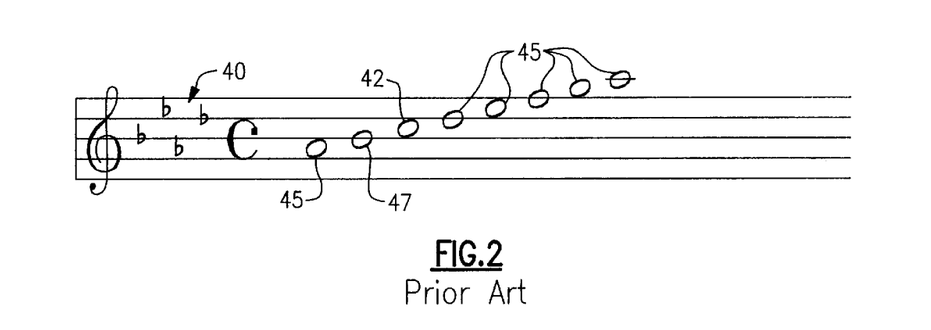
FIG. 2 is a prior art scale written on sheet music in the key of A flat major.

Similarly, the scale of FIG. 2 is in the key of A flat major so that four flats are required to produce semitones at the third and seventh steps. These four flats are B, E, A, and D, and are marked by flat symbols (♭) in key signature 40. These notes are flatted whenever they appear even though they are depicted without the flat symbol ♭. Thus, of the eight notes 45 of the scale, the four flat notes B, E, A, and D are played as flats. For example, a note 47, while appearing as a B, is played as a B flat. The remaining three notes, F, G, and C, appear as natural notes and are so played. A note 42, C, is played as a natural C. The base of each note 45 is represented as a circle or nearly circular shape.

Figure 3:
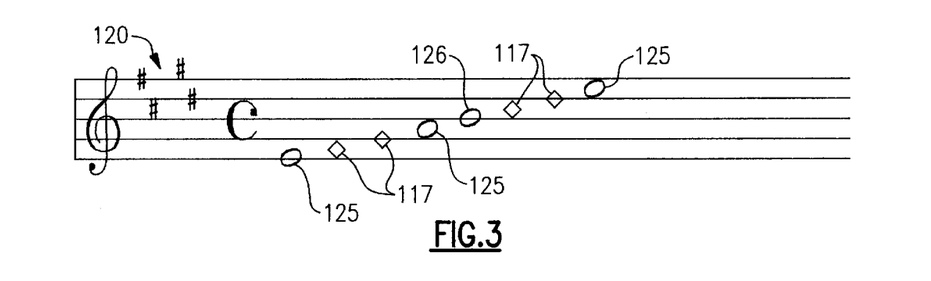
FIG. 3 is a scale written on sheet music in the key of E major according to a first embodiment of the present invention.
Figure 4:
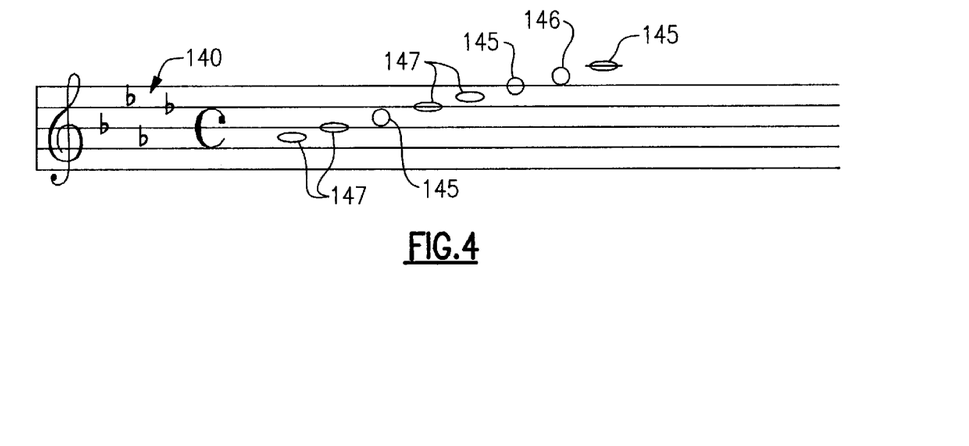
FIG. 4 is a scale written on sheet music in the key of A flat major according to the first embodiment of the present invention.

Referring to FIGS. 3 and 4, the two scales of FIGS. 1 and 2 are respectively shown marked on the sheet music according to a first embodiment of the present invention. A key signature 120 shows that the scale of FIG. 3 is E major, as is the scale shown in FIG. 1. A plurality of notes 125, when played in succession, form the scale of E major. A base of a natural note 126 is a first base shape, shown here as round, whereas a base of sharped notes 117 are shaped as a second base shape, differing from the first base shape, and depicted here as diamonds. The diamond shape is preferred due to the ease of making the shape and for the "sharp" edges which are easily related to the sharped notes by the student.

Thus, by looking directly at each note, the student or musician can tell exactly what is to be played without reference to the key signature. The key signature is thus not necessary for reading and playing the music, but is maintained for informational (reference) value and overall comprehension. Over a period of time, the student recognizes the characteristics of the musical key by familiarity rather than by memorization, counter-memorization, and translation.

A plurality of notes 145 form the scale of A flat major shown in FIG. 4. The four required flats, B, E, A, and D, are shown in key signature 140. While the base of a natural note 146 is the first base shape, i.e., round, a base of each flat note 147 is a third base shape, differing from the first and second base shapes, and preferably presented representationally as a flattened oval. The flattened oval is preferred due to the ease of making the shape and for the "flat" shape which is easily related to the flat notes by the student.

Other base shapes can alternatively be used as long as the first, second, and third base shapes are different.

Figure 5:
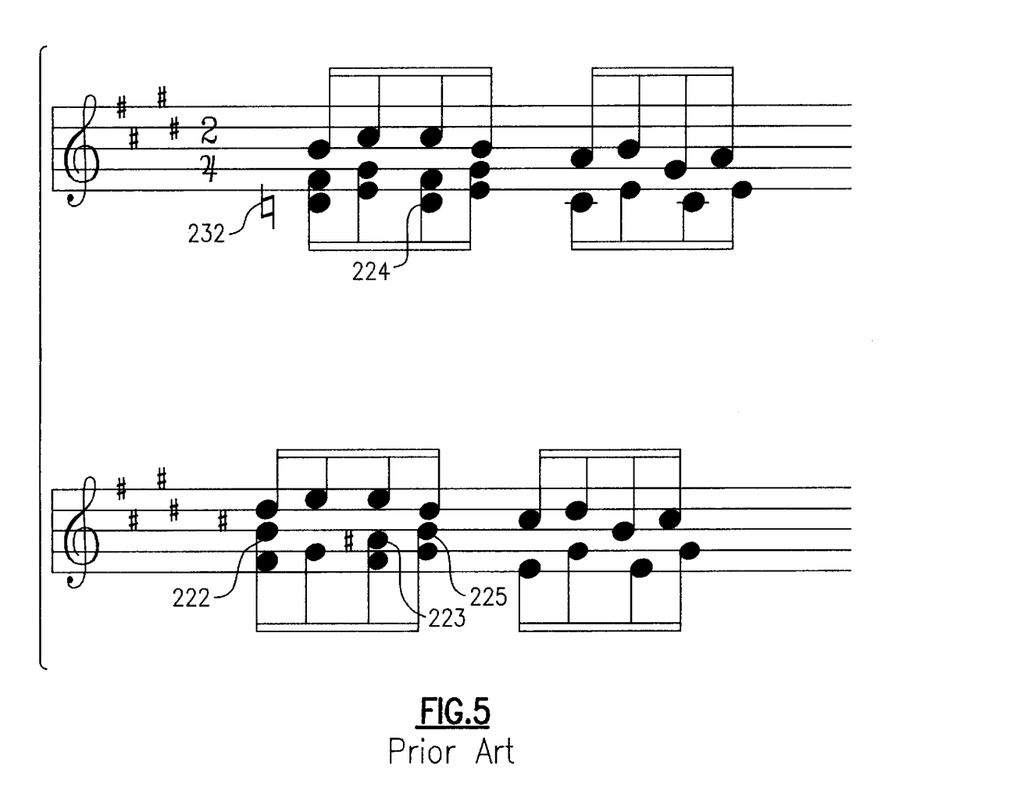
FIG. 5 is a segment of sheet music in the key of E major according to the prior art.

Referring to FIG. 5, a portion of music from Chopin's Etude (Op. 10, #3) is displayed using conventional musical notation. According to the key signature, there are four sharps, F, C, G, and D. Any notes other than these that are to be played as a sharp must be individually noted by the # symbol, as for example a note 222, B#, and a note 223, A#. If a D natural, that is a non-sharped D is to be played, the natural symbol, ♮, is used as shown for a note 232, D♮. This section of music presents further difficulties to trap the unwary. A note 224, although unaccompanied by a natural sign, must be read and played as a natural note even though the key signature indicates it should be played as a sharp, since under conventional musical notation, an extra sharp, flat, or natural symbol remains in effect from its location through the end of the measure. This occurs again in a note 225 of the second measure.

Figure 6:
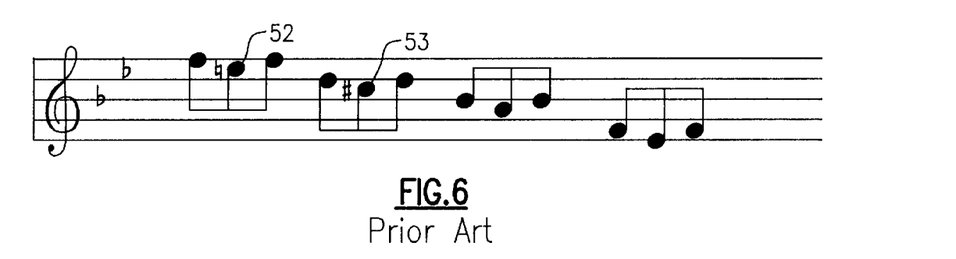
FIG. 6 is a segment of sheet music in the key of B flat major according to the prior art.

Referring to FIG. 6, the key signature indicates B flat major, requiring two flats, B and E. A note 52 is preceded by a natural sign, ♮, to indicate it is to be played as an E natural instead of an E flat. A note 53 is preceded by a sharp sign, #, to indicate it is to be played as a C sharp instead of a C natural.

Figure 7:
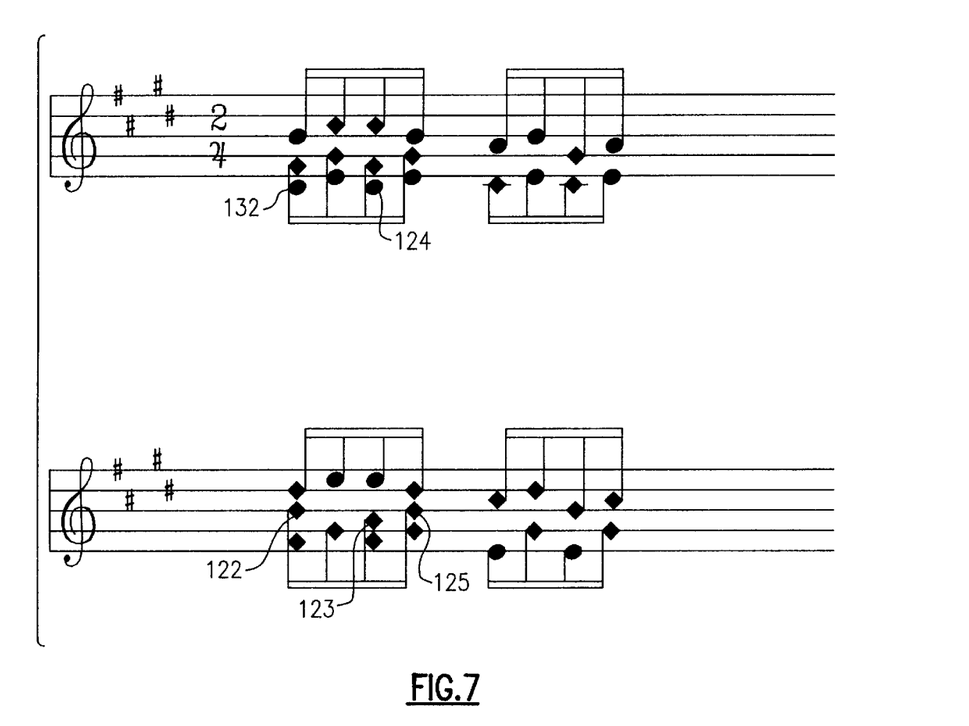
FIG. 7 is a segment of sheet music notated according to the first embodiment of the present invention for the prior art score of FIG. 5.

Referring to FIG. 7, the score of FIG. 5 is written according to the musical notation of the present invention. The student or advanced musician need not refer to the key signature to realize which notes must be played one semitone above their nominal tone. (The nominal tone is the tone indicated by the position of the base of the note.) Notes 222, 223, and 232 of FIG. 5 are shown as notes 122, 123, and 132 in FIG. 7 when written according to the present invention. A note 124, corresponding to note 224 in FIG. 5, is played as a natural note, which fact is immediately clear to the player. Thus the player need not remember, as with the notation of the prior art, that a note once altered in a measure remains altered throughout the measure. A note 125, corresponding to note 225 of FIG. 5, is another example of this occurrence.

Figure 8:
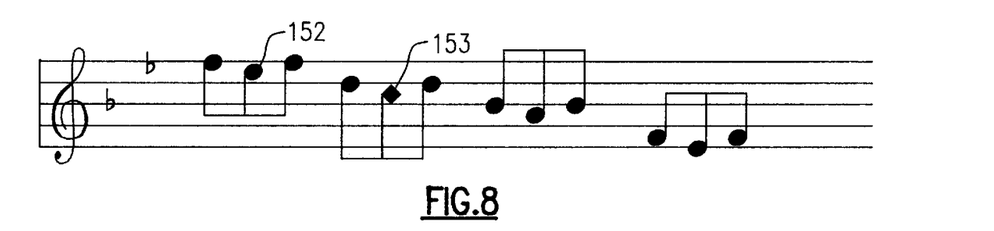
FIG. 8 is a segment of sheet music notated according to the first embodiment of the present invention for the prior art score of FIG. 6.

Referring to FIG. 8, a note 152, played as E♮, is represented by a note having a round base. A note 153, played as C#, is represented by a note having the diamond base.

The system of musical notation according to the present invention simplifies printing music since fewer symbols are needed than is the case using the conventional system to convey the same information. In addition, viewing and playing chords is simplified since the eye need not determine each of the notes and at the same time determine which lines are changed by the extra notations of #, ♭, or ♮. Only the line position of each shaped is considered while reading and playing.

Figure 9A:
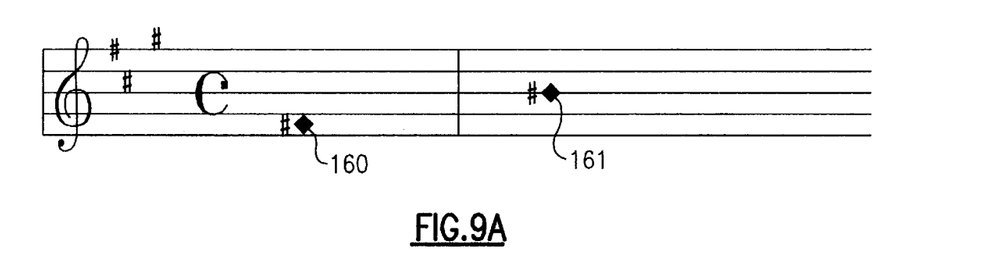
FIG. 9A is a segment of sheet music notated according to the first embodiment of the present invention for illustrating a double sharped note.

Referring to FIG. 9A, a double sharped note 160 is shown by placing a sharp symbol before the diamond shaped note. Note 160 is a key signature note meant to be played as a double sharp. A note 161 is a non-key signature note meant to be played as a double sharp. In each case, the student readily sees that notes 160 and 161 are played as double sharps. Alternatively, a diamond with even sharper angles can be used.

Figure 9B:
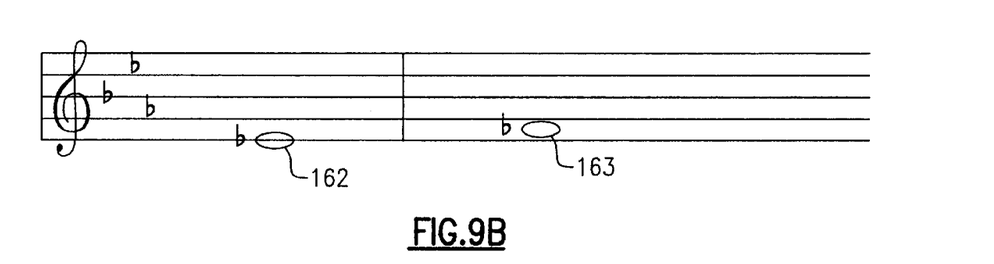
FIG. 9B is a segment of sheet music notated according to the first embodiment of the present invention for illustrating a double flatted note.

Referring to FIG. 9B, a double flatted note 162 is shown by placing a flat symbol before the flattened oval base note. Note 162 is a key signature note meant to be played as a double flat. A note 163 is a non-key signature note meant to be played as a double flat. Alternatively, an even flatter oval can be used to signify a double flatted note. It is also possible, in accordance with this invention, to use entirely different shapes for double sharps or double flats.

Figure 10:
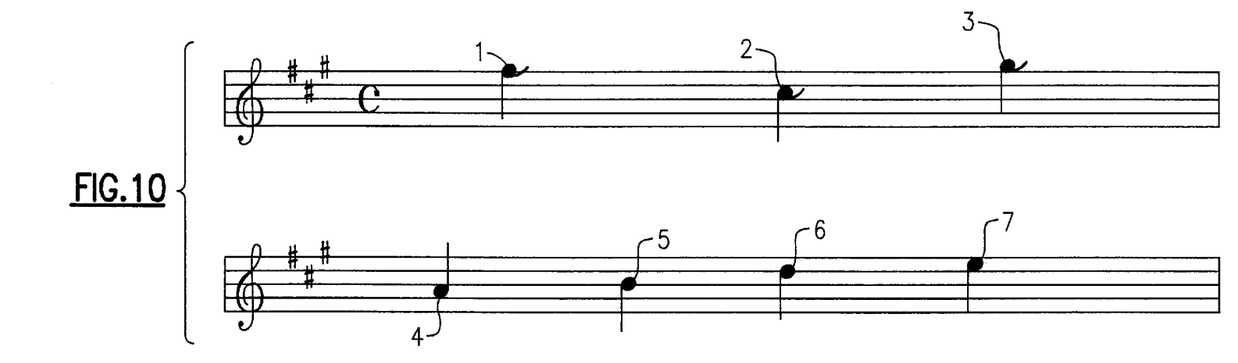
FIG. 10 is a segment of sheet music in the key of A notated according to a second embodiment of the present invention.

Referring to FIG. 10, a second embodiment of the present invention is shown. According to the second embodiment, only those notes which are sharped or flatted due to the key signature are signified by using altered base shapes. These notes are hereinafter referred to as "key signature" notes. Thus, three notes 1, 2, and 3 have an altered shape ("second base shape") signifying that these three notes, F, C, and G, are the key signature (normally sharped) notes in the key of A. Four notes 4, 5, 6, and 7 have an unaltered base shape ("first base shape") since they are the natural notes ("non-key signature" notes) A, B, D, and E in the key of A. The altered base shape signifying a sharped key signature note is preferably represented by a tail angled upward and to the right, thus naturally indicating both the direction on the scale (upward) of the increased semitone and the direction on the keyboard (right) that the musician's fingers move to play the altered note.

Figure 11:
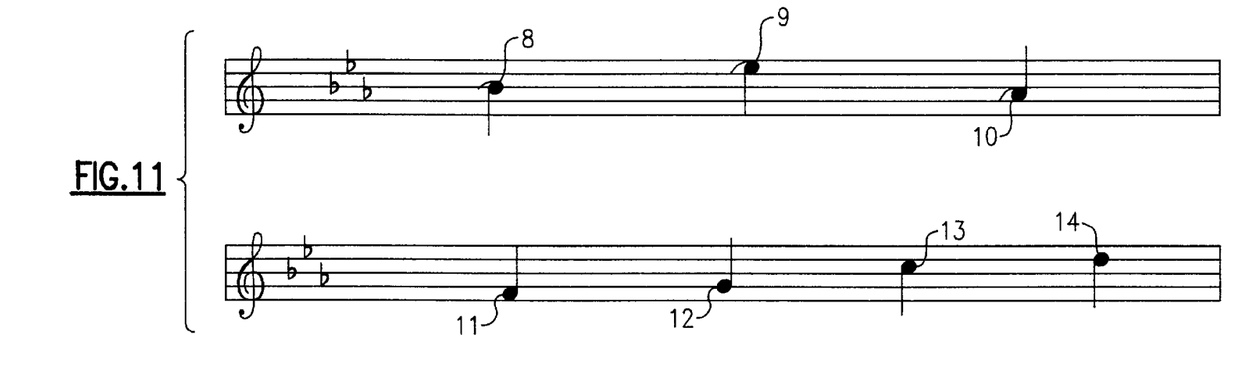
FIG. 11 is a segment of sheet music in the key of E-flat noted according to the second embodiment of the present invention.

Referring to FIG. 11, three notes 8, 9, and 10 have an altered base shape ("third base shape") signifying that these three notes, B, E, and A, are the key signature notes (normally flatted) in the key of E flat. Four notes 11, 12, 13, and 14 have an unaltered base shape ("first base shape") since they are the non-key signature notes (natural notes) F, G, C, and D in the key of E flat. The altered base shape signifying a flatted key signature note is preferably represented by a tail angled downward and to the left, thus naturally indicating both the direction on the scale (down) of the decreased semitone and the direction on the keyboard (left) that the musician's fingers move to play the altered note.

Other base shapes can alternatively be used as long as the first, second, and third base shapes are different.

Figure 12:
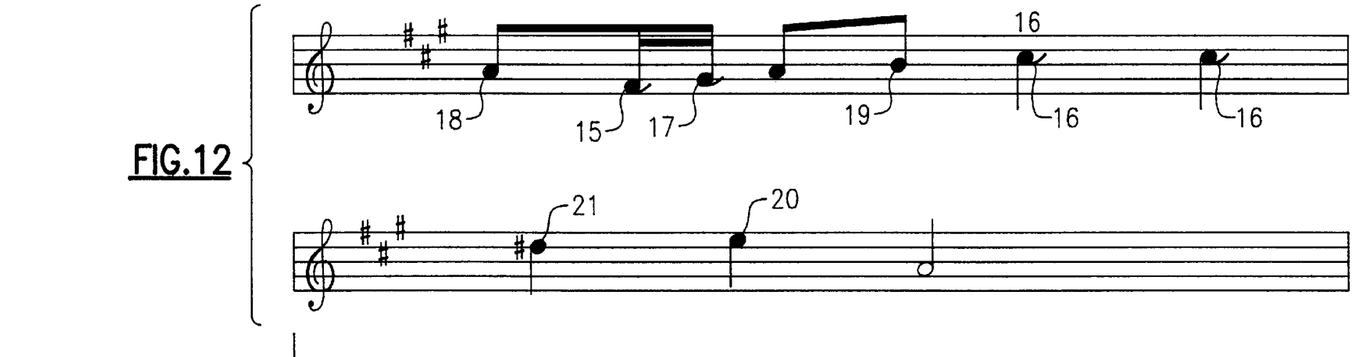
FIG. 12 is a segment of sheet music in the key of A notated according to the second embodiment of the present invention illustrating a sharped non-key signature note.

Referring to FIG. 12, a piece of music in the key of A is shown. Key signature notes 15 (F), 16 (C), and 17 (G) are shown using the second base shape since they are sharped due to the key signature. Non-key signature notes 18 (A), 19 (B), and 20 (E) are shown using the first base shape since they remain natural. A non-key signature note 21 (D) is shown using the first base shape, since it is a non-key-signature note, preceded by a sharp sign to indicate the nominal tone is sharped, i.e., raised a half tone and therefore played as a D#.

Figure 13:
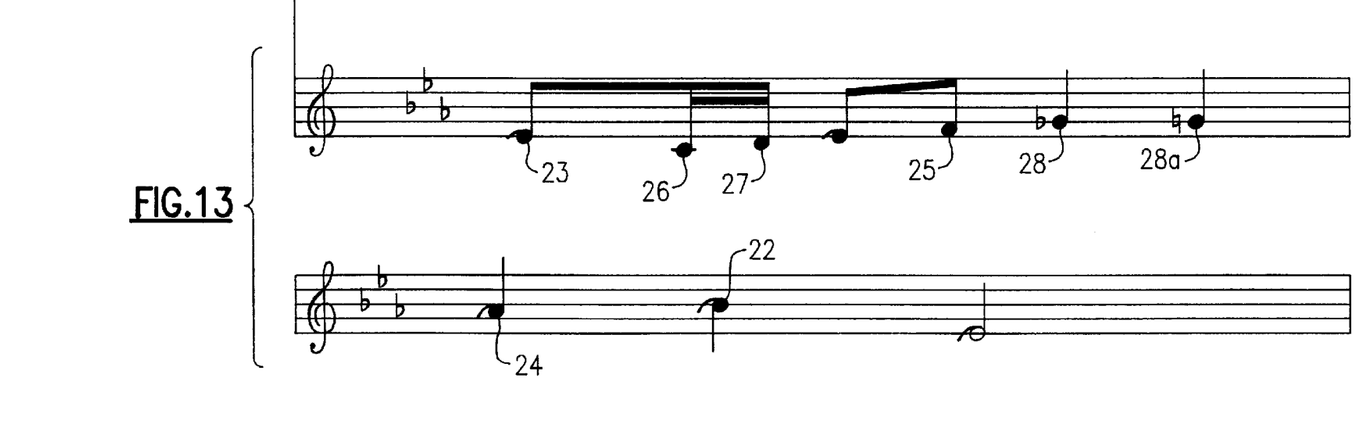
FIG. 13 is a segment of sheet music in the key of E-flat notated according to the second embodiment of the present invention illustrating a flatted non-signature note.

Referring to FIG. 13, key signature notes 22 (B), 23 (E), and 24 (A) are shown using the third base shape since they are flatted due to the key signature. Non-key-signature notes 25 (F), 26 (C), and 27 (D) are shown using the first base shape since they remain natural. Since a non-key-signature note 28 (G) is played as a flat, it is shown using the first base shape preceded by a flat symbol and played as a G♭. A non-key signature note 28a, since it is played as a natural note, is preceded by a natural sign ♮, since conventionally a note retains its marking throughout a measure unless remarked differently.

Figure 14:
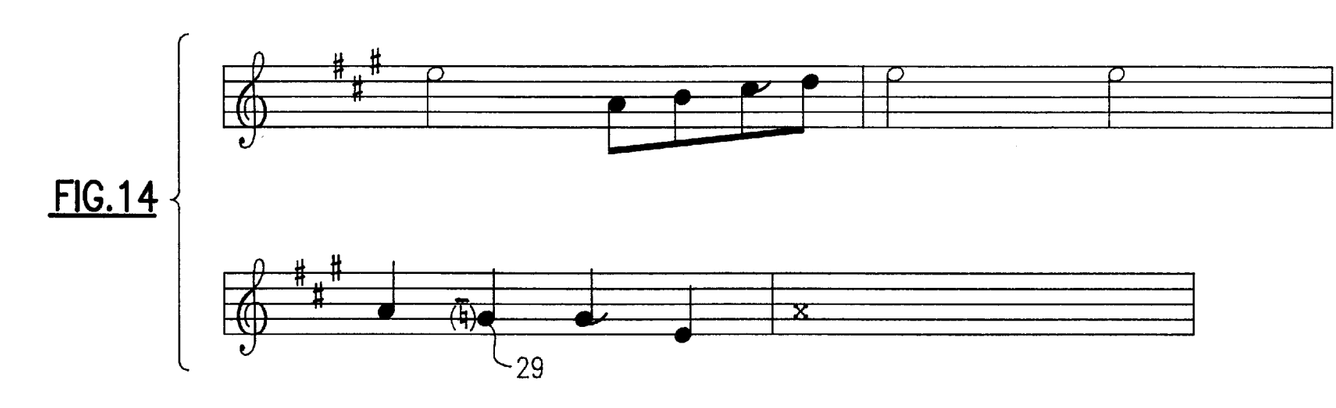
FIG. 14 is a segment of sheet music in the key of A notated according to the second embodiment of the present invention illustrating a naturalized key signature note.

Referring to FIG. 14, since a key signature note 29 (G) is to be played as a natural note, it is shown using the first base shape. However, to aid learning the key signature and its affected notes, note 29 is preceded by a natural sign ♮ in parentheses with an overscore to indicate the usual tone for the note would be a half tone higher, i.e., a sharp.

Figure 15:
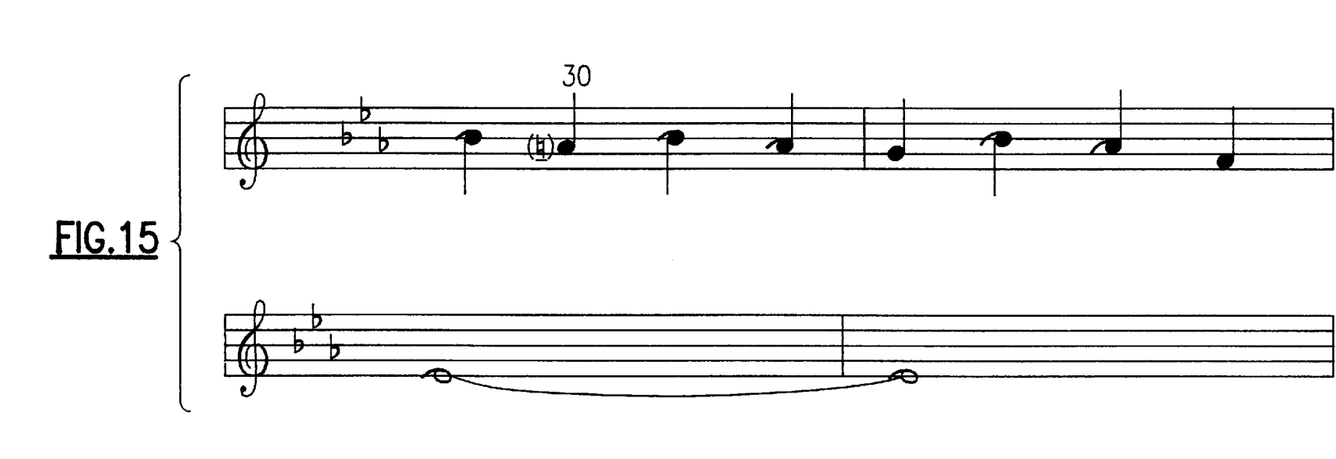
FIG. 15 is a segment of sheet music in the key of E-flat notated according to the second embodiment of the present invention illustrating a naturalized key signature note.

Referring to FIG. 15, a key signature note 30 (A) is shown using the first base shape since it is to be played as a natural note. However, to aid learning the key signature and its affected notes, note 30 is preceded by a natural sign ♮ in parentheses with an underscore to indicate the usual tone for the note would be a half tone lower, i.e., a flat. That is, naturalized key signature notes, while shown using the first base shape, have an overscored parenthesized natural sign if normally a sharped note and an underscored parenthesized natural sign if normally a flatted note.

Figure 16:
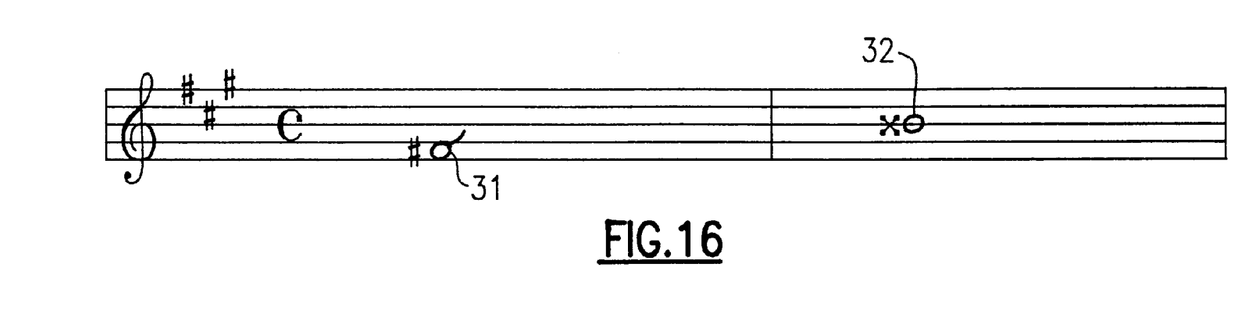
FIG. 16 is a segment of sheet music notated according to the second embodiment of the present invention for illustrating a key signature double sharped note and a non-key signature double sharped note.

Referring to FIG. 16, a note 31 (F) is double sharped. Since note 31 is a key signature note, it is shown using the second base shape preceded by a sharp sign. A note 32 (B) is also double sharped, but since note 32 is a non-key signature note, it is shown using the first base shape preceded by a conventional double sharp symbol.

Figure 17:
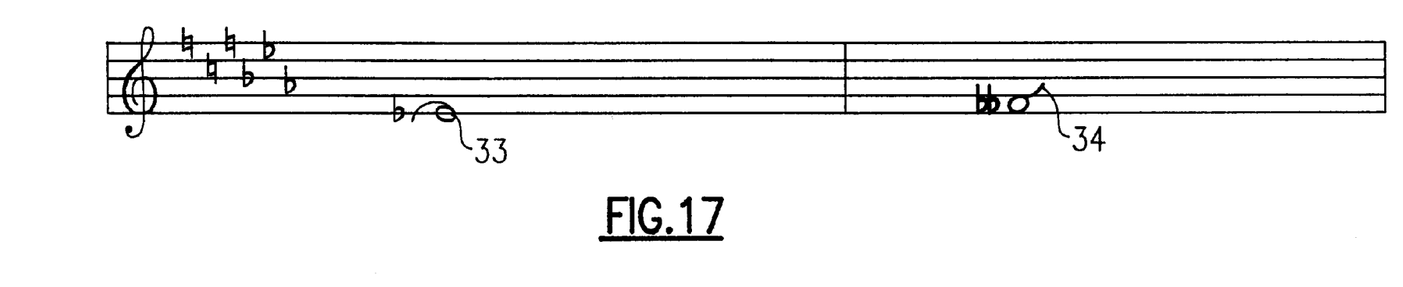
FIG. 17 is a segment of sheet music notated according to the second embodiment of the present invention for illustrating a key signature double flatted note and a non-key signature double flatted note.

Referring to FIG. 17, a note 33 (E) is double flatted. Since note 33 is a key signature note, it is shown using the third base shape preceded by a flat sign. A note 34 (F) is also double flatted, but since note 34 is a non-key signature note, it is shown using the first base shape preceded by a conventional double flat symbol.

Both embodiments allow the musician to play the piece of music without having to refer to the key signature. In the first embodiment, the key signature appears in the measure but has no effect on the tones of the notes played. The key signature is included solely to aid the musician in becoming familiar with the key signature concept and in easily determining what key the music is written in.

The key signature in the second embodiment likewise has no effect on how the notes are played, but the system of musical notation of the second embodiment enables the musician to play the piece without referring to the key signature while maintaining the integrity of the key signature. Key signature notes use special base shapes to show whether they are sharped or flatted due to the key signature. Non-key signature notes use conventional sharp and flat symbols to indicate whether they are sharped or flatted. Double sharps/flats and naturalized notes are also signaled in such a way as to highlight the key signature while not requiring referral to the key signature in order to play the notes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of writing a piece of music on a music staff and of reading said piece of music, said method comprising the steps of:

representing all natural notes of said piece of music on said music staff by a first base shape;

representing all sharp notes of said piece of music on said music staff by a second base shape distinct from said first base shape if said sharp notes are sharped due to a key signature;

representing all sharp notes of said piece of music on said music staff by said first base shape preceded by a sharp symbol if said sharp notes are not sharped due to said key signature;

representing all sharp notes of said piece of music on said music staff by said first base shape preceded by a sharp symbol if said sharp notes are not sharped due to said key signature;

representing all flat notes of said piece of music on said music staff by a third base shape, distinct from said first and second base shapes, if said flat notes are flatted due to said key signature;

representing all flat notes of said piece of music on said music staff by said first base shape preceded by a flat symbol if said flat notes are not flatted due to said key signature;

wherein each of said representing steps includes the step of positioning each of said notes in the same position on the music staff as the notes when represented on a sheet of music utilizing standard musical notation; and reading said piece of music by reading said represented notes without any reference to said key signature.

2. The method according to claim 1, further including the steps of:

representing all double sharp notes of said piece of music on said music staff by said second base shape preceded by a sharp symbol if said double sharp notes are first sharped due to said key signature;

representing all double sharp notes on said music staff by said first base shape preceded by a double sharp symbol if said double sharp notes are not first sharped due to said key signature;

representing all double flat notes of said piece of music on said music staff by said third base shape preceded by a flat symbol if said double flat notes are first flatted due to said key signature; and representing all double flatted notes of said piece of music on said music staff by said first base shape preceded by a double flat symbol if said double flat notes are not first flatted due to said key signature.

3. The method of claim 2, further including the steps of:

preceding each naturalized key signature note of said piece of music on said music staff by a parenthesized natural symbol;

over scoring each said parenthesized natural symbol on said music staff if each said naturalized note is sharped when a parenthesized natural symbol is not present; and over scoring each said parenthesized natural symbol on said music staff if each such naturalized note is flatted when a parenthesized natural symbol is not present.

4. A sheet of music created by a musical notation method of writing music on a music staff, said notation method comprising the steps of:

representing all natural notes of said piece of music on said music staff by a first base shape;

representing all sharp notes of said piece of music on said music staff by a second base shape distinct from said first base shape if said sharp notes are sharped due to a key signature;

representing all sharp notes of said piece of music on said music staff by said first base shape preceded by a sharp symbol if said sharp notes are not sharped due to said key signature;

representing all flat notes of said piece of music on said music staff by a third base shape, distinct from said first and second base shapes, if said flat notes are flatted due to said key signature; and representing all flat notes of said piece of music on said music staff by said first base shape preceded by a flat symbol if said flat notes are not flatted due to said key signature;

wherein each of said representing steps includes the step of positioning each of said notes in the same position on the music staff as the notes when represented on a sheet of music utilizing standard musical notation.

5. The sheet of music of claim 4, wherein said musical notation system can be used for polyphonic music in which more than one tone is played at the same time.

6. The sheet of music of claim 4, wherein said musical notation method includes the step of representing multiple clefs in addition to treble clef and bass clef.

* * * * *